(12) United States Patent
Meemann et al.

(10) Patent No.: US 10,509,502 B2
(45) Date of Patent: Dec. 17, 2019

(54) OPERATING DEVICE

(71) Applicant: Robert Bosch GmbH, Stuttgart (DE)

(72) Inventors: Daniel Meemann, Hildesheim (DE); Ingo Hermanns, Hildesheim (DE); Thomas Freitag, Algermissen (DE)

(73) Assignee: Robert Bosch Gmbh, Stuttgart (DE)

( * ) Notice: Subject to any disclaimer, the term of this patent is extended or adjusted under 35 U.S.C. 154(b) by 0 days.

(21) Appl. No.: 15/777,152

(22) PCT Filed: Sep. 16, 2016

(86) PCT No.: PCT/EP2016/071954
§ 371 (c)(1),
(2) Date: May 17, 2018

(87) PCT Pub. No.: WO2017/084785
PCT Pub. Date: May 26, 2017

(65) Prior Publication Data
US 2018/0329559 A1   Nov. 15, 2018

(30) Foreign Application Priority Data
Nov. 18, 2015 (DE) .................. 10 2015 222 714

(51) Int. Cl.
| | |
|---|---|
| G06F 3/041 | (2006.01) |
| G05G 1/02 | (2006.01) |
| G05G 5/03 | (2008.04) |
| G06F 3/01 | (2006.01) |
| H04M 1/02 | (2006.01) |

(52) U.S. Cl.
CPC .............. G06F 3/0414 (2013.01); G05G 1/02 (2013.01); G05G 5/03 (2013.01); G06F 3/016 (2013.01); H04M 1/0266 (2013.01); H04M 2250/22 (2013.01)

(58) Field of Classification Search
CPC ......... G06F 3/0414; G06F 3/016; G05G 1/02; G05G 1/03; H04M 1/0266
See application file for complete search history.

(56) References Cited

U.S. PATENT DOCUMENTS 6,030,291 A * 2/2000 Maki .................. G05G 9/047
                                                      345/161
2011/0205038 A1   8/2011 Drouin et al.
2013/0285801 A1  10/2013 Jung et al.

FOREIGN PATENT DOCUMENTS

DE    102011082143 A1   3/2013
EP       3018563 A1   5/2016

OTHER PUBLICATIONS

International Search Report dated Dec. 14, 2016 of the corresponding International Application PCT/EP2016/071954 filed Sep. 16, 2016.

* cited by examiner

Primary Examiner — Liliana Cerullo
(74) Attorney, Agent, or Firm — Norton Rose Fulbright US LLP; Gerard Messina

(57) ABSTRACT

An operating device includes a planar operating element that includes at least one large surface and that is operable by an operator with the aid of an input element, and the operating device includes a mounting that enables a stroke movement of the operating element perpendicular to the large surface and that sets the operating element into a rotation in parallel to its large surface during the stroke movement.

4 Claims, 5 Drawing Sheets

OPERATING DEVICE

CROSS-REFERENCE TO RELATED APPLICATIONS

The present application is the national stage of International Pat. App. No. PCT/EP2016/071954 filed Sep. 16, 2016, and claims priority under 35 U.S.C. § 119 to DE 10 2015 222 714.6, filed in the Federal Republic of Germany on Nov. 18, 2015, the content of each of which are incorporated herein by reference in their entireties.

BACKGROUND

Operating devices that have a touch-sensitive surface, whether it is a so-called touchpad or a touchscreen or touch display screen, are increasingly being used for operating electronic devices. Touch display screens having a resistive or capacitive operating principle are widespread. These are distinguished in that an electrical signal can be triggered by touching the touch-sensitive surface with an input element, such as a finger of an operator's hand or a stylus. Further electrical signals can be generated or derived by brushing the touch-sensitive surface or touching and/or brushing at multiple points of the touch-sensitive surface.

To give the user feedback about the touch or the function thus triggered of the electronic device, for example, a so-called haptic feedback can be provided. This can be implemented, for example, in the form of a mechanical mounting of the touch-sensitive element which yields to pressure. It can also be provided that the touch-sensitive element is deflected out of its idle position with the aid of an actuator activated by an electrical signal.

DE 10 2011 082 143 A1 describes an operating device having an operating element including haptic feedback, the operating element being operable by an operator with the aid of an input element, including a first and a second planar component which are aligned with their large surfaces in parallel to each other and are movable relative to each other, the first planar component forming the operating element or transmitting its movement entirely or partially to the operating element, which is distinguished in that the planar components are guided between an idle position and an actuating position while maintaining their parallelism relative to each other, the distance between the two planar components being less in the actuating position than in the idle position, and the two planar components being spring-loaded in their idle position. In addition to the stroke movement, the operating element carries out a translation in parallel to the large surface upon operation, i.e., it is parallelogram-guided.

In addition, mounting including horizontal displaceability of the surface by mounting on spring or elastomeric elements is also known.

SUMMARY

The introduction of vibration-based technologies to generate haptic feedback requires the synchronous movement of larger surfaces, for example, entire display screens or touch panels.

For large surfaces, for example, display screens, a parallelogram guide requires quite large overall heights, or with lesser overall height, very stable components, since high forces occur. A stable construction is accompanied by increased mass, which requires a stronger motor drive for maintaining a required vibration amplitude and/or vibration frequency or alternately reduces the vibration intensity and bandwidth.

In the case of rapid movements, as are required for generating a haptic feedback, a parallelogram guide appears less suitable, since wobbling motions arise, which can result in unevenness of the movement.

Compared to a horizontally movable mounting, the provided approach offers the advantage of a substantially stronger haptic experience, since the palpability of movements transverse to the axis of the touching finger, i.e., in parallel to the plane of the touch-sensitive surface with a finger acting thereon at least partially perpendicularly thereto, is significantly less than axis-parallel movements, i.e., perpendicular to the surface.

The measurement of the actuating force is an essential feature of good haptic approaches. Such a force measurement normally requires multiple sensors in the case of large haptic surfaces, for example, display screens, which increases the costs. In the case of a commercially available tablet computer, this is implemented, for example, with the aid of four strain gauges situated behind the large surface of the operating element.

In the approach according to the present invention, the surface of the operating element and therefore its large surface provided for the touch, carry out a type of screw movement upon their deflection, i.e., a translation perpendicular to the large surface, also called a stroke or stroke movement hereafter, and a rotation in parallel to the large surface and thus about an axis perpendicular or orthogonal to the large surface or in parallel to the direction of the stroke movement.

For this purpose, an operating device including an operating element is provided, the operating element being formed as a planar component having at least one large surface, the operating element being operable by an operator with the aid of an input element by touching on the large surface, where the operating element is mounted in a manner by which a stroke movement of the operating element perpendicular to the large surface is enabled, which is distinguished in that the mounting is designed for the purpose of additionally setting the operating element into a rotation in parallel to its large surface during a stroke movement.

The mounting of the operating element can advantageously include levers that connect the operating element to counter bearings. The levers are advantageously designed as tilt levers. These levers, which are advantageously in one piece, connect various points of the rear surface, which faces away from the large surface provided for touching, of the operating element or touch panel or touch display screen to the surroundings. The length and installation angle of the levers establish the ratio of rotational movement to linear movement.

The tilt levers are advantageously restorable into their respective starting positions with the aid of spring force. For this purpose, the levers can advantageously be designed as spring levers which are flexible per se.

The levers are advantageously connected via first bearings to the operating element and via second bearings to the counter bearings, the rotation being specified by the alignment of the first and second bearings. The axes of both the first and the second bearings are advantageously aligned with the rotation center. The angle between operating element and lever and the distance of the lever from the rotation center determine the ratio of rotation to stroke movement. An acute angle results in a small rotation and large stroke, and an obtuse angle in contrast in an increased rotation angle and a lesser stroke height. Upon the use of multiple levers, which can have different distances from the rotation point, the angle is to be selected in each case in such a way that the same ratio of stroke to rotation angle results for all levers.

Deviations from this design result in constraining forces and material stresses in the lever construction and within the operating element or the counter bearing. The material stresses within the lever in particular act as a restoring force, which aims to restore the lever into its particular starting position. This effect can advantageously be used. The levers are advantageously manufactured for this purpose from an elastic material, for example, spring steel.

The present invention makes use of the circumstance that only small strokes of the operating element in the order of magnitude of tenths of millimeters are necessary and do not interfere with a minor rotation about the axis orthogonal to the large surface of the operating element.

The advantage of this construction is that all points of the planar operating element are synchronized via tensile and shear forces, which are to be conducted very effectively even via the thin operating element or display screen or panel surface in comparison to bending and torsion forces.

Furthermore, the approach according to the present invention has the advantage that a drive of the operating element with the aid of an actuator, for example, a motor drive in the horizontal plane, i.e., in parallel to the large surface of the operating element, is possible, which facilitates the design implementation. For example, the number of the drives can be reduced from two—right/left—to a single one.

A soft or thin planar operating element can be set into a synchronous movement with little constructive expenditure. The simple construction of, for example, a large-area pushbutton is thus possible using only a single, also mechanical, switching element.

The simple construction enables a low-mass design, which is particularly advantageous in the case of rapid or high-frequency movements.

In this way, for example, a large-area, thin sound generator or loudspeaker can be implemented in a simple way, in which the operating element is used as the diaphragm generating the sound waves.

The surface of the operating element can have a layout which is selectable within broad limits and/or is arbitrary.

Upon the use of an optical touch sensor including deflection mirrors and multiple optical transceiver elements, the actuating force can be inferred very easily via the measurement of rotation angle φ of the operating element. A special force sensor, as is generally necessary for haptic functions, can thus be dispensed with.

The synchronous downward movement or also the rotary movement of the operating element can be used directly to operate a switch.

The measurement of a pressure force on the surface of the operating element upon its operation can be implemented using only one force sensor. For this purpose, for example, rotation angle φ or the height of the stroke movement, the drop of the operating element here, can be measured at any arbitrary point of the operating element.

Occurring rotation φ can be compensated for if two guide systems of the provided type are connected in succession, i.e., mechanically in series. The bearing levers of the second system point in the opposite direction compared to the levers of the first system for this purpose, and therefore a rotation in the opposite direction to the first system results in the second system. If both systems have the same rigidity and the same ratio of rotation angle to stroke, the rotation angles of both systems thus cancel out precisely.

Exemplary embodiments of the present invention are illustrated in the drawings and will be explained in greater detail hereafter. Identical reference numerals in the drawings identify identical or identically acting elements.

DETAILED DESCRIPTION

Figure 1:
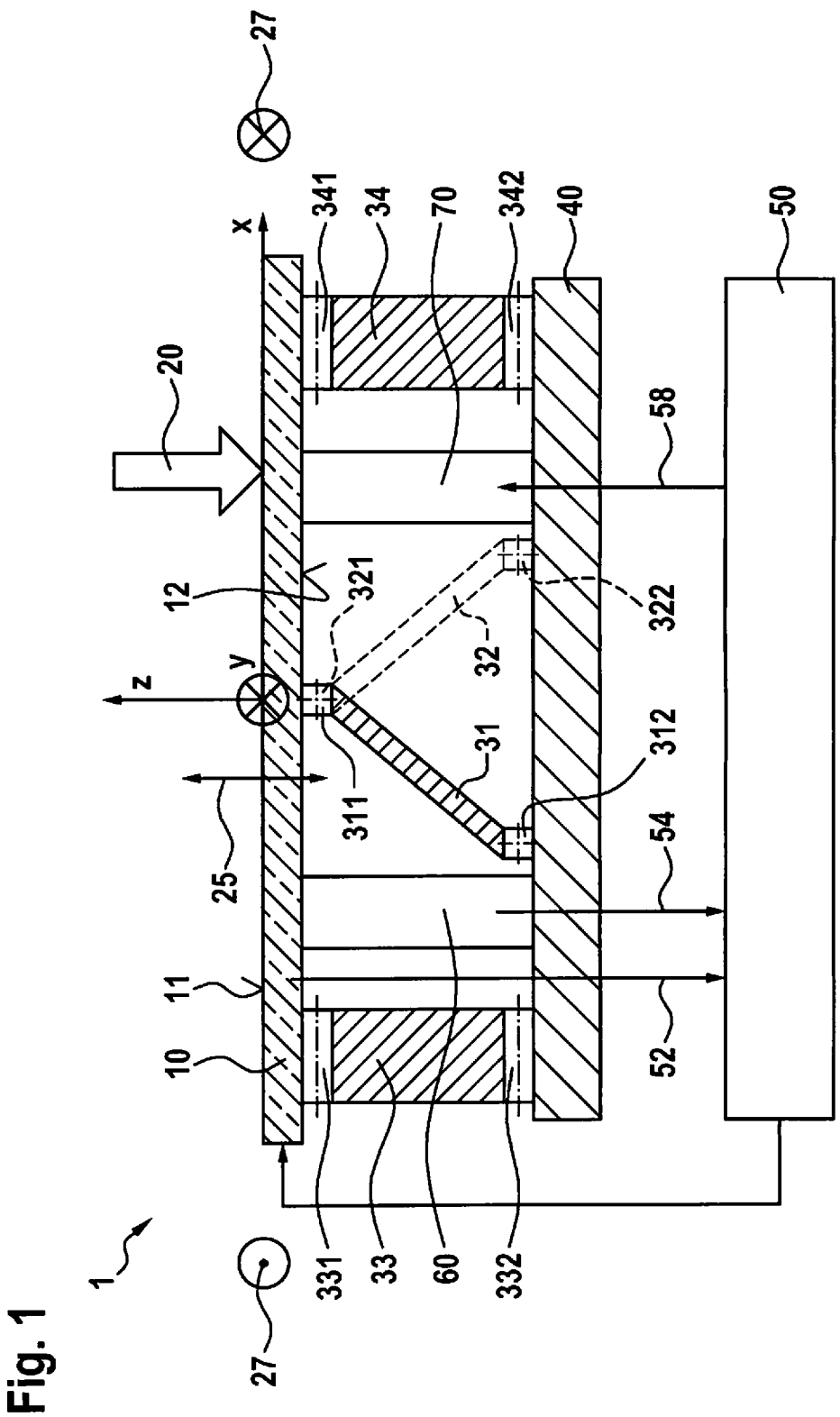
FIG. 1 is a block diagram of an operating device according to an example embodiment of the present invention.
Figure 2:
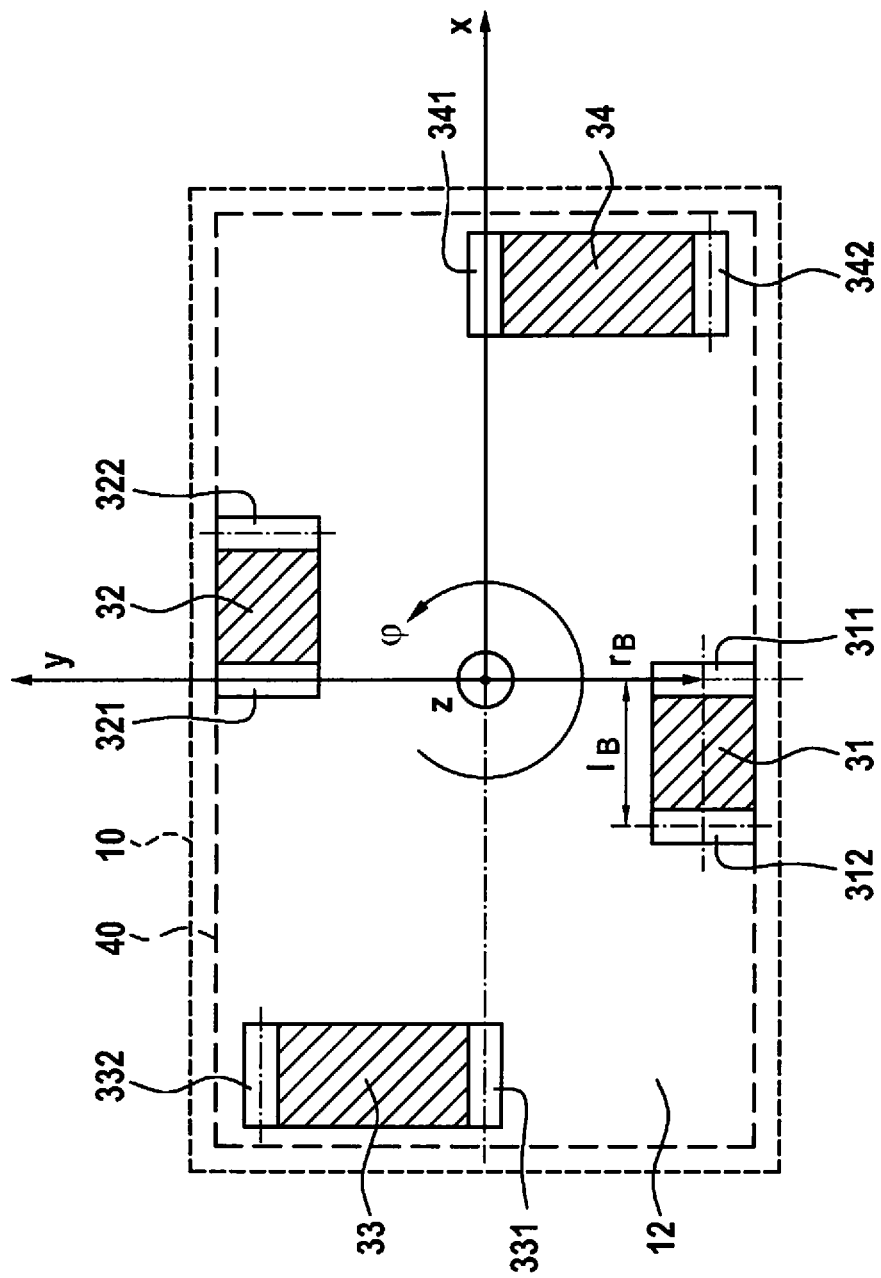
FIG. 2 is a diagram that schematically illustrates the operating mode of the mechanical part of the operating device of FIG. 1 according to an example embodiment of the present invention.

A Cartesian coordinate system including coordinates x, y, and z is introduced in FIGS. 1 and 2. In FIG. 1, the x coordinate points to the right, the y coordinate points into the plane of the drawing, and the z coordinate points upward. In the view according to FIG. 2, the x coordinate points to the right, the y coordinate points upward, and the z coordinate points out of the plane of the drawing.

In FIG. 1, operating device 1 includes a planar operating element 10 including a rectangular surface 11, as is apparent from FIG. 2, which is also referred to as large surface 11. Large surface 11 lies here in the surface spanned by the x and the y coordinates. The surface facing away from large surface 11 of operating element 10 is also referred to as rear side 12.

Operating element 10 is designed in the present case as a touch-sensitive operating element, i.e., as a so-called touch panel, additionally including a display function here, i.e., as a touch display screen. The pieces of information provided for display on display screen 10 are supplied to display screen 10 by a controller 50.

Upon touching of large surface 11 of the operating element, preferably with the aid of an input element 20 of an operator, i.e., one or multiple finger(s) of an operator's hand or, for example, with the aid of a stylus, the operating element generates an electrical operating signal 52 or an electrical variable, which is detected by controller 50. This operating signal 52 or this electrical variable is processed by controller 50 and converted into a control signal for triggering functions of an electronic device, which includes operating device 1 according to the present invention.

If a pressure is exerted on the large surface by input element 20, it can be detected by a sensor 60, for example, a pressure sensor, for example, a piezo sensor or strain gauge, which is situated on rear side 12 of operating element 10 and supplied as a sensor signal 54 to controller 50. In response to an operating signal 52 and/or a sensor signal 54, the controller can generate a vibration signal 58, which is converted with the aid of an actuator 70 connected to rear side 12 of operating element 10, for example, a piezo-actuator, into an oscillating stroke movement 25 in parallel to the z axis, i.e., perpendicular to large surface 11 of the operating element, and therefore as a vibration of operating element 10.

In the exemplary embodiment shown in FIGS. 1 and 2, operating element 10 is connected via levers 31, 32, 33, and 34, which are situated on its rear side 12, to a baseplate 40, for example, a circuit board of the electronic device. Levers 31, 32, 33, and 34 are designed in the present case as tilt levers or swiveling levers. First tilt lever 31 is connected at its upper end via a first bearing 311 to the rear side of operating element 10, and at its lower end via a second bearing 312 to a first counter bearing, which is formed here by baseplate 40. Similarly, second tilt lever 32 is connected at its upper end via a third bearing 321 to lower side 12 of operating element 10 and at its lower end via a fourth bearing 322 to a second counter bearing, for example, baseplate 40, third tilt lever 33 is connected at its upper end via a fifth bearing 331 to lower side 12 of operating element 10 and at its lower end via a sixth bearing 332 to a third counter bearing, for example, baseplate 40, and fourth tilt lever 34 is connected at its upper end via a seventh bearing 341 to lower side 12 of operating element 10 and at its lower end via an eighth bearing 342 to a fourth counter bearing, for example, baseplate 40.

Tilt levers 31, 32, 33, and 34 are dimensioned and situated in such a way that upon deflection of operating element 10 against the z axis, i.e., perpendicular to large surface 11 of operating element 10, i.e., upon a stroke movement 25 of operating element 10 in the negative z direction, for example, as a result of a pressure by operating body 20, they guide operating element 10 on a spiral path with a counter-clockwise rotation 27. Operating element 10 therefore follows a screw or corkscrew-type movement.

For this purpose, the axes about which first bearing 311, third bearing 312, fifth bearing 331, and seventh bearing 341 are rotatable and tilt levers 31, 32, 33, and 34 are tiltable or pivotable, respectively, are located on radials originating from the axis about which rotary movement 27 of operating element 10 is to take place during its stroke 25. In the present case, this axis is coincident with the z axis of the Cartesian coordinate system shown in the figures. The rotation axis of first bearing 311 is on the y axis in its negative value range in FIG. 1, the rotation axis of third bearing 321 is on the y axis in its positive value range, and the rotation axis of fifth bearing 331 is on the x axis in its negative value range and the rotation axis of seventh bearing 341 is on the x axis in its positive value range. The rotation axis of second, i.e., lower bearing 312 of first lever 31 is in parallel to that of first bearing 311, but displaced in relation thereto in the negative z direction and in the negative x direction.

First tilt lever 31 is thus not situated perpendicularly in the x direction, but rather is tilted along the x axis, i.e., at an angle not equal to 90°, for example, of α=60°, below rear side 12 in relation thereto. Similarly, second tilt lever 32 is not situated perpendicularly in the x direction, but rather is tilted opposite to the x axis, i.e., at an angle not equal to 90°, for example, of α=120°, below rear side 12 in relation thereto. Upon application of a force to operating element 10 in the direction of arrow 20, first tilt lever 31 therefore tilts about second bearing 312 in direction 315, while second tilt lever 32 tilts about fourth bearing 322 in direction 325. Since moreover first upper bearing 311 and the second upper bearing have equal distance $r_B$ from the z axis in the radial direction, and moreover lengths $l_B$ of first tilt lever 31 and second tilt lever 32 are equal, operating element 10, upon application of a pressure force, carries out a stroke movement in the negative z direction, on the one hand, i.e., it is dropped in the figure, at the same time it is forced into a rotary movement by an angle φ about the z axis, i.e., it carries out a helical movement overall.

This also applies similarly to the further tilt levers, namely third tilt lever 33 and fourth tilt lever 34, which moreover cause an additional support of operating element 10 and thus prevent tilting of the operating element about the y axis.

The number and arrangement of the levers are variable. The more levers are used, the lower are the requirements on the bending stiffness of the surface. This is significant in particular in the case of large and thin surfaces, such as display screens, touchpads, touch panels, and the like.

To generate a restoring torque against arrow direction 20, the levers can be designed as flexible springs, for example, that are preferably not freely rotatable at least on one side, but rather are fixed, for example, in first 312, third 322, fifth 332, and seventh bearings 342.

Figure 3:
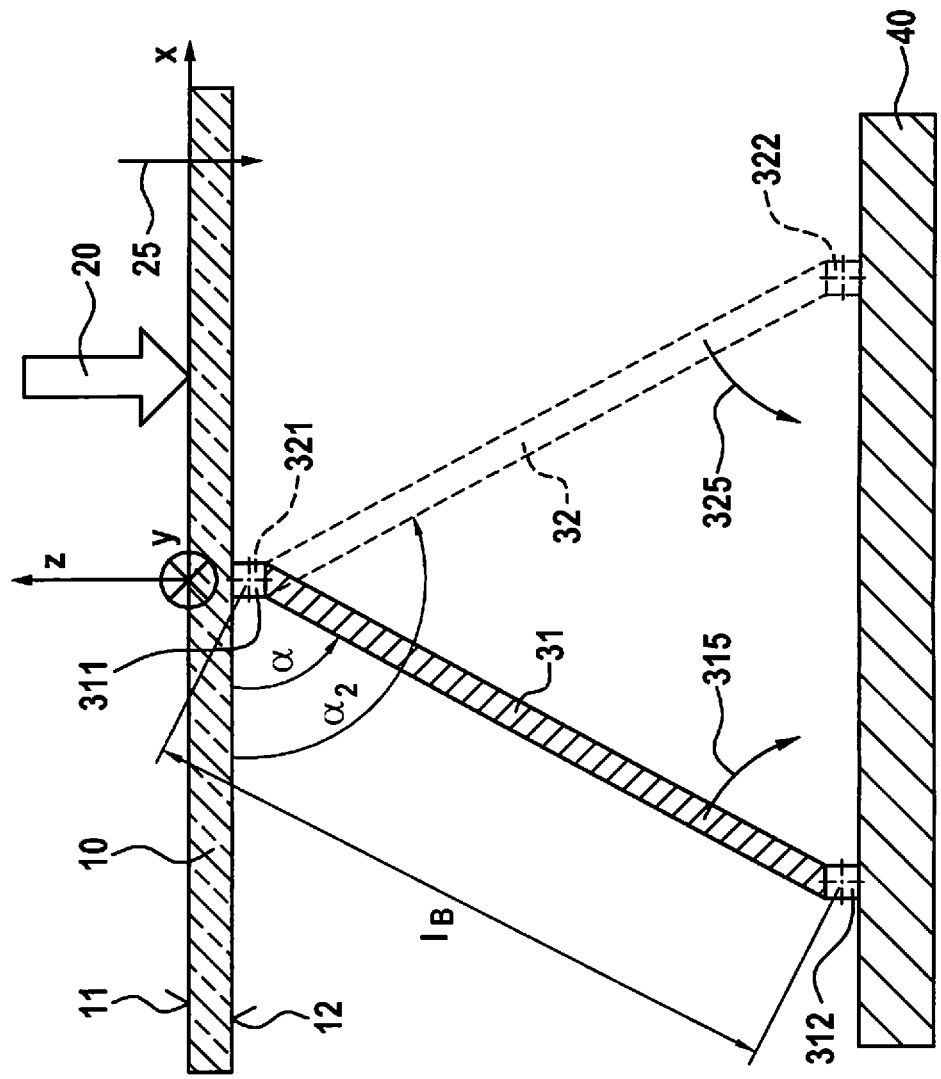
FIG. 3 shows a detail from FIG. 1, according to an example embodiment of the present invention.
Figure 4:
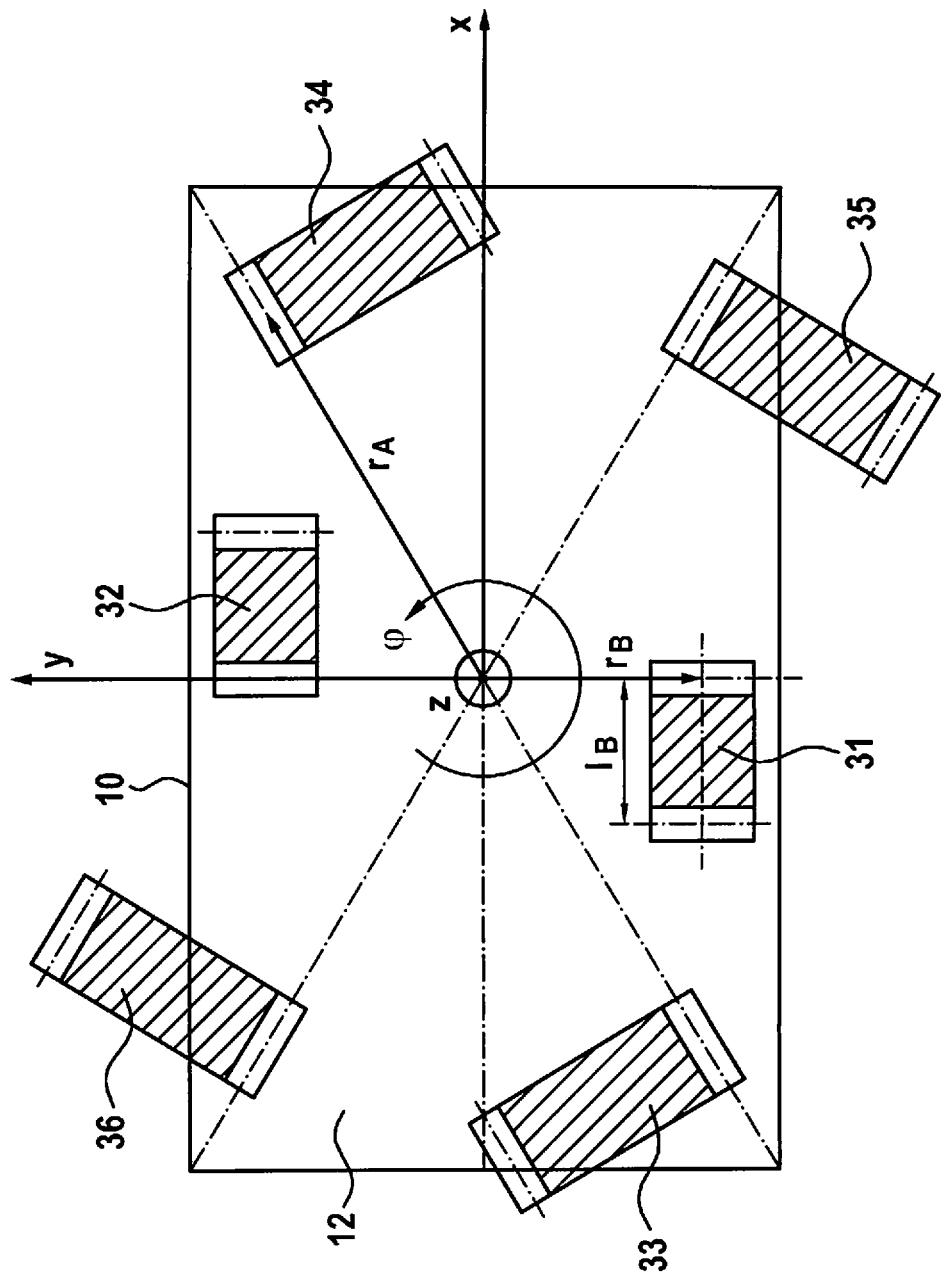
FIG. 4 shows an alternative to FIG. 2, according to an example embodiment of the present invention.

In the exemplary embodiment shown in FIG. 4, six levers are provided. Four tilt levers 33, 34, 35, and 36 thereof are situated in or close to the corners of rectangular surface 12 of operating element 10, the upper bearings of these tilt levers being on the diagonals of surface 12 and thus radials originating from rotation axis z. The distances of the upper bearings of these tilt levers are each situated spaced apart by $r_A$ from the z axis and thus describe a circle about the z axis. Two further tilt levers correspond to first 31 and second tilt lever 32 of FIGS. 1 through 3. The dimensions and installation angle α (33, 34, 35, 36) are identical for all levers 33 through 36, since radius $r_A$ about rotation axis z is equal for all of these tilt levers. Since first tilt lever 31 and second tilt lever 32 engage at a distance $r_B$ from rotation axis z deviating therefrom, their lengths $l_B$ are different from those of tilt levers 33, 34, 35, and 36, as also shown in the figures.

The calculation guideline for length and installation angle of levers 31, 32, 33, 34, 35, and 36 as a function of the distance of their upper bearings from rotation axis z reads in approximated form as follows:

installation angle α=arctan($r_B$×sin(φ)/z), lever length $l_B$=h/sin(α), z denoting the height of stroke 25 and h denoting the distance of rear side 12 of the operating element from baseplate 40 or lower bearings 311, 321, 331, 341 of tilt levers 31, 32, 33, 34. The calculation guidelines are approximations, because the springs are, strictly speaking, slightly trapezoidal in the preferred example embodiment.

Figure 6:
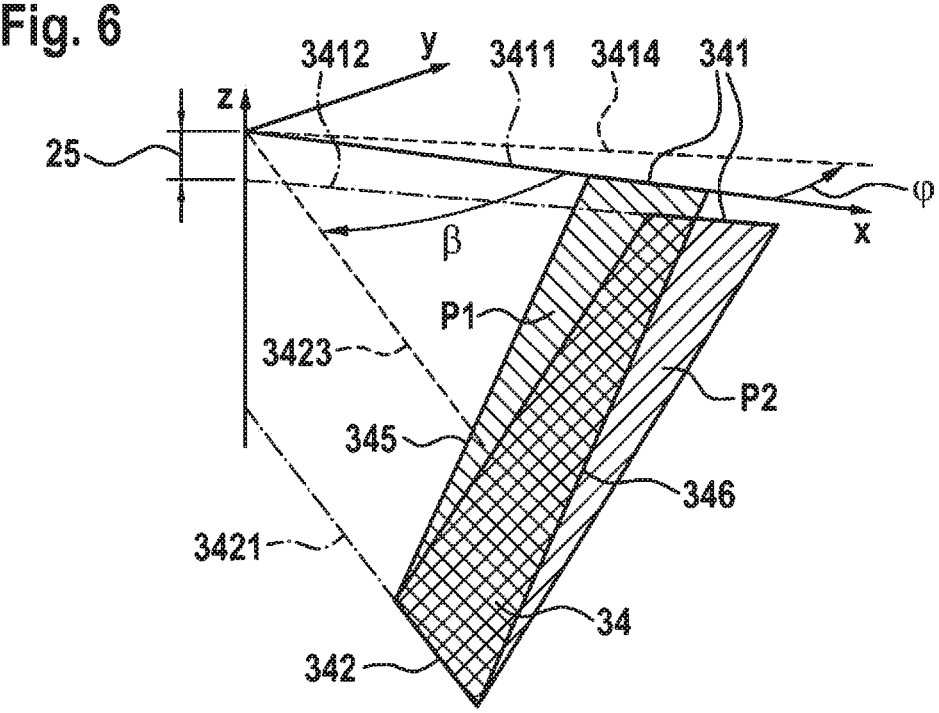
FIG. 6 illustrates geometries of tilt levers used in an example embodiment of the present invention.

This is illustrated in FIG. 6 on the basis of the example of fourth tilt lever 34 according to FIG. 2. Rotation axis 3411 of upper, seventh bearing 341 is coincident here with the x axis and points toward the rotation axis of operating element 10, i.e., the z axis. Since rotation axis 3421 of lower, eighth bearing 342 is also aligned with the z axis, rotation axes 3411 of upper bearing 341 and 3421 of lower bearing 342 are not in parallel to each other, but rather form an angle in relation to one another. This is apparent from projection 3423 of rotation axis 3421 in the plane spanned by the x and y coordinates and spanned by large surface 11 of operating element 10, where projection 3423 of rotation axis 3421 of lower bearing 342 is at an angle β to rotation axis 3411 of upper bearing 342. Accordingly, the rotation axes of the upper and lower bearings are not situated exactly in parallel to each other, since the upper and lower axes face toward the center point, i.e., the z axis. Outer edge 346 of tilt lever 34 is therefore larger on the outside, i.e., on its edge facing away from the z axis than its inner edge 345 facing toward rotation axis z. Furthermore, the installation angle on the side of the lever facing toward the z axis is slightly more obtuse than on outer side 346 of lever 34 facing away from the z axis. This means that tilt lever 34 is already slightly twisted in starting position P1, i.e., is slightly twisted per se along its longitudinal axis. Upon pressure application on operating element 10, operating element 10 and therefore its large surface 11, as a result of the arrangement of tilt levers 31, 32, 33, and 34, tilt lever 34 in FIG. 6, follows a helical path, i.e., it drops by stroke 25 and rotates counterclockwise by rotational angle φ between rotation axis 3411 of upper bearing 341 in the starting position and projection 3414 of rotation axis 3412 of upper bearing 341, which is dropped by stroke 25, into deflected position P2.

Figure 5:
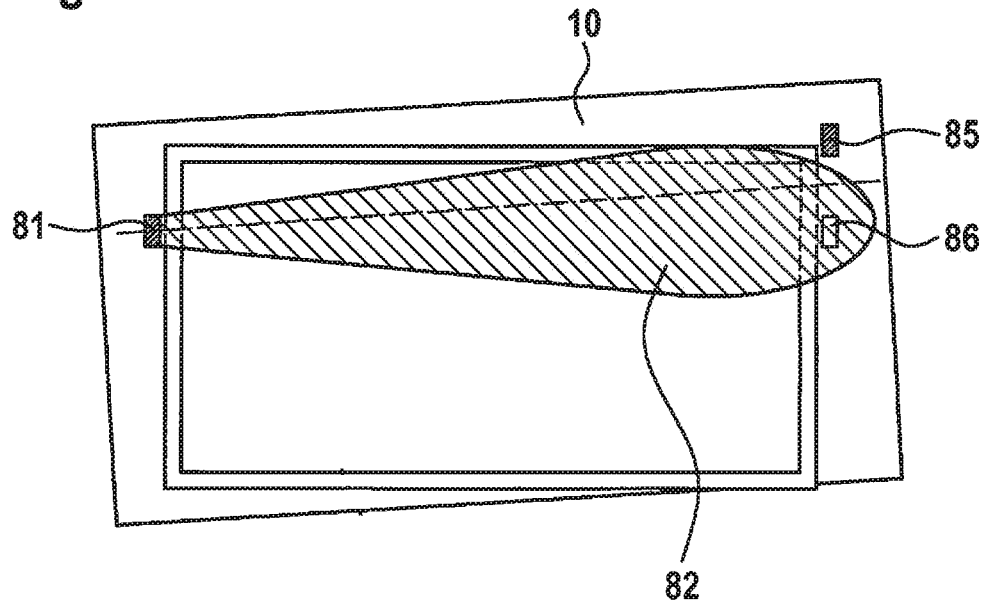
FIG. 5 illustrates an analysis for determining a deflection of the operating element of the operating device according to an example embodiment of the present invention.

An evaluation arrangement for determining the actuating force 20 and an amount of deflection 25, 27 of operating element 10 as a result of an actuating force 20 acting thereon is sketched in FIG. 5.

The pressure-loaded state is shown, in which operating element 10 is deflected in the form of a screw movement, i.e., a combined stroke and rotary movement.

Upon pressure application on surface 11, for example, the touch surface, it is pivoted 27 in relation to a housing 41, on which a light source 81, for example, a light-emitting diode, is situated. Since operating element 10 has a light guide function at the same time, the direction of light beam 82 emitted by light source 81 changes accordingly. This change can be established by light-sensitive elements 85 and 86 situated spaced apart from each other. For this purpose, these light-sensitive elements are situated in such a way that they have a distance in relation to each other and moreover operating element 10 functions as a light guide between light source 81 and light-sensitive elements 85 and 86. The difference of the luminosity of these at least two adjacent light sensors 85 and 86 corresponds to the amount of the deflection of operating element 10 and is thus an amount of applied pressure force 20. The evaluation can preferably take place in controller 50, which generates a control signal or a control function as a function of the established deflection and/or pressure force.

What is claimed is:

1. An operating device comprising:
   a planar operating element including a surface and operable by an operator using an input element; and
   a mounting that:
   enables a stroke movement of the operating element perpendicular to the surface; and
   is designed to set the operating element into rotation during the stroke movement and about an axis that is perpendicular to the surface, wherein the mounting includes levers that connect the operating element to counter bearings, and wherein the levers are tilt levers.

2. The operating device of claim 1, wherein the tilt levers are restorable with a spring force into starting positions.

3. An operating device comprising:
   a planar operating element including a surface and operable by an operator using an input element and
   a mounting that:
   enables a stroke movement of the operating element perpendicular to the surface; and
   is designed to set the operating element into rotation during the stroke movement and about an axis that is perpendicular to the surface, wherein the mounting includes levers that connect the operating element to counter bearings, wherein the levers are flexible spring levers.

4. An operating device comprising:
   a planar operating element including a surface and operable by an operator using an input element; and
   a mounting that:
   enables a stroke movement of the operating element perpendicular to the surface; and
   is designed to set the operating element into rotation during the stroke movement and about an axis that is perpendicular to the surface, wherein the mounting includes levers that connect the operating element to counter bearings, wherein the levers are connected via first bearings to the operating element and via second bearings to the counter bearings, and a manner in which the rotation can occur is affected by a dimensioning of the levers and an arrangement of the levers to one another.

* * * * *